(12) United States Patent
Shimizu et al.

(10) Patent No.: US 11,522,227 B2
(45) Date of Patent: Dec. 6, 2022

(54) SECONDARY BATTERY AND COMB-TYPE ELECTRODE

(71) Applicant: Honda Motor Co., Ltd., Tokyo (JP)

(72) Inventors: Wataru Shimizu, Saitama (JP); Masahiro Ohta, Saitama (JP); Toru Sukigara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 461 days.

(21) Appl. No.: 16/699,129

(22) Filed: Nov. 29, 2019

(65) Prior Publication Data

US 2020/0176823 A1 Jun. 4, 2020

(30) Foreign Application Priority Data

Nov. 30, 2018 (JP) .............................. JP2018-224456

(51) Int. Cl.
*H01M 10/0585* (2010.01)
*H01M 10/0562* (2010.01)
(Continued)

(52) U.S. Cl.
CPC ... *H01M 10/0585* (2013.01); *H01M 10/0525* (2013.01); *H01M 10/0562* (2013.01); *H01M 2004/027* (2013.01); *H01M 2004/028* (2013.01)

(58) Field of Classification Search
CPC ......... H01M 10/0585; H01M 10/0525; H01M 10/0562; H01M 2004/027; H01M 2004/028
See application file for complete search history.

(56) References Cited

U.S. PATENT DOCUMENTS

2009/0208825 A1* 8/2009 Lee ..................... H01M 50/463
429/94
2016/0285137 A1* 9/2016 Gayden .................. H01G 11/24
(Continued)

FOREIGN PATENT DOCUMENTS

JP 2002075322 3/2002
JP 2007080812 3/2007
(Continued)

OTHER PUBLICATIONS

"Office Action of Japan Counterpart Application" with English translation thereof, dated Oct. 19, 2021, p. 1-p. 4.

*Primary Examiner* — Jayne L Mershon
(74) *Attorney, Agent, or Firm* — JCIPRNET

(57) ABSTRACT

Provided is a secondary battery and a comb-type electrode. A negative electrode layer sheet formed by stacking a negative electrode active material layer on two surfaces of a negative electrode current collector and a positive electrode layer sheet formed by stacking a positive electrode active material layer on two surfaces of a positive electrode current collector are alternately stacked, and an electrolyte body is interposed between the negative electrode layer sheet and the positive electrode layer sheet adjacent in a stacking direction. Each of the negative electrode current collector and the positive electrode current collector includes a bent connecting part sandwiching a notch part and formed by bending two sides in directions opposite to each other. The bent connecting parts of the negative electrode current collectors adjacent in the stacking direction and the bent connecting parts of the positive electrode current collectors adjacent in the stacking direction are connected.

11 Claims, 5 Drawing Sheets

(51) Int. Cl.
*H01M 10/0525* (2010.01)
*H01M 4/02* (2006.01)

(56) References Cited

U.S. PATENT DOCUMENTS

2017/0104247 A1* 4/2017 Son .................... H01M 50/502
2020/0194847 A1* 6/2020 Choi ................... H01M 50/572

FOREIGN PATENT DOCUMENTS

| JP | 5354646 | 11/2013 |
|----|---------|---------|
| JP | 2015118870 | 6/2015 |

* cited by examiner

SECONDARY BATTERY AND COMB-TYPE ELECTRODE

CROSS-REFERENCE TO RELATED APPLICATION

This application claims the priority of Japan patent application serial no. 2018-224456, filed on Nov. 30, 2018. The entirety of the above-mentioned patent application is hereby incorporated by reference herein and made a part of this specification.

BACKGROUND

Technical Field

The disclosure relates to a secondary battery and a comb-type electrode used therein.

Description of Related Art

In many products, fields, such as smart phones, electric vehicles, etc., there is a demand for a battery with high capacity, high voltage, and high energy density etc., and research and development have been actively conducted. In addition, currently, lithium-ion batteries (secondary batteries) whose main components are positive electrodes, negative electrodes, separators, and electrolytic solutions are frequently used as batteries.

Meanwhile, owing to various advantages such as lower risk of ignition, higher thermal stability at high and low temperatures and therefore a wide operating temperature range, higher design freedom, being difficult to have a side reaction with only Li ions moving and therefore difficult to degrade, favorable handling property and therefore higher productivity, no liquid leakage, etc., solid state batteries (secondary batteries) using not electrolytic solution but inorganic solid state electrolyte have drawn much attention.

Patent Document 1 (Japanese Laid-Open No. 2015-118870) and Patent Document 2 (Japanese Patent No. 5354646) disclose a solid state battery (solid state battery stacked body of the solid state battery) configured by forming a positive electrode layer by coating a positive electrode composite material (mixture) on a surface of a positive electrode current collector (positive electrode current collector foil), forming a negative electrode layer by coating a negative electrode composite material (mixture) on a surface of a negative electrode current collector (negative electrode current collector foil), and stacking the positive electrode layer, a solid state electrolyte, the negative electrode layer, the solid state electrolyte, the positive electrode layer, and so on so forth in order and performing pressing.

Here, in the solid state battery, to ensure and maintain the properties at the time of design, press forming at a high surface pressure in the state where the solid state battery stacked body is formed and a subsequent high restraint pressure are required.

Therefore, in the conventional structure in which punched electrodes are stacked, as shown in FIG. 8, there is an issue that a dead space H becomes larger due to bending of a tab welding part 1 as the high basis weight electrodes that are stacked for a higher capacity or the number of stacked layers increases.

In addition, when the large dead space H is generated due to bending of the tab welding part 1, the capacity density of a solid state battery stacked body (cell) 2 is decreased; moreover, a difference in how tension is applied to the end parts of composite materials 3 occurs due to a difference in curvature, and such difference may remain as internal stress after the press forming of the solid state battery stacked body 2, which makes it difficult to maintain an electrode group structure.

SUMMARY

An aspect of the disclosure provides a secondary battery. The secondary battery (e.g., solid state battery A described afterwards) of the disclosure is characterized in that a negative electrode layer sheet (e.g., negative electrode layer sheet 18 described afterwards) formed by integrally stacking a negative electrode active material layer (e.g., negative electrode active material layer 11 to be described afterwards) on a surface and another surface of a negative electrode current collector (e.g., negative electrode current collector 10a, negative electrode current collector layer 10 to be described afterwards) that is a sheet-like electrode and a positive electrode layer sheet (e.g., positive electrode layer sheet 21 to be described afterwards) formed by integrally stacking a positive electrode active material layer (positive electrode active material layer 13 to be described afterwards) on a surface and another surface of a positive electrode current collector (e.g., positive electrode current collector 14a, positive electrode current collector layer 14 to be described afterwards) that is a sheet-like electrode are alternately stacked and disposed, an electrolyte body (e.g., solid state electrolyte body 23, solid state electrolyte layer 12 to be described afterwards) is interposed between the negative electrode layer sheet and the positive electrode layer sheet adjacent in a stacking direction (e.g., stacking direction T3 described afterwards), notch parts (e.g., notch part 15 described afterwards) are disposed at end parts of the negative electrode current collector and the positive electrode current collector, each of the negative electrode current collector and the positive electrode current collector includes a bent connecting part (e.g., bent connecting parts 17, 20 to be described afterwards) sandwiching the notch part and formed by bending two sides in directions opposite to each other, and the bent connecting parts of the negative electrode current collectors adjacent in the stacking direction are connected, and the bent connecting parts of the positive electrode current collectors adjacent in the stacking direction are connected.

According to an embodiment of the disclosure, in the secondary battery, a sheet-like solid state electrolyte body (solid state electrolyte 23, solid state electrolyte layer 12 to be described afterwards) is continuously interposed by passing between the negative electrode layer sheet and the positive electrode layer sheet adjacent in the stacking direction and being substantially zigzag from a side to another side in the stacking direction.

According to an embodiment of the disclosure, in the secondary battery, the notch parts are formed by expanding a width of base ends (e.g., base end 15a described afterwards) sides of the negative electrode current collector and the positive electrode current collector.

According to an embodiment of the disclosure, in the secondary battery, a grooving part (e.g., grooving part 16 described afterwards) linearly extending along a width direction from the notch part is disposed on each of the negative electrode current collector and the positive electrode current collector.

Another aspect of the disclosure provides a comb-type electrode. The comb-type electrode (e.g., comb-type negative electrode 24, comb-type positive electrode 25 described afterwards) of the disclosure is characterized in that each electrode layer sheet (e.g., negative electrode layer sheet 18, positive electrode layer sheet 21 described afterwards) which sandwiches a notch part (e.g., notch part 15 described afterwards) disposed at an end part and to bend two sides in directions opposite to each other is stacked and disposed at a predetermined interval, and the comb-type electrode is formed by connecting bent connecting parts (e.g., bent connecting parts 17, 20 described afterwards) that are bent in the directions opposite to each other of the electrode layer sheets adjacent in a stacking direction (e.g., stacking direction T3 described afterwards).

According to an embodiment of the disclosure, in the comb-type electrode of the disclosure, the notch part of the electrode layer sheet is formed by expanding a width of a base end (e.g., base end 15a described afterwards) side.

According to an embodiment of the disclosure, in the comb-type electrode, a grooving part (e.g., grooving part 16 described afterwards) which linearly extends along a width direction from the notch part and serves for bending the bent connecting part is disposed on the electrode layer sheet.

DESCRIPTION OF THE EMBODIMENTS

The disclosure provides a secondary battery and a comb-type electrode capable of reducing the dead space, increasing the capacity density, and reducing the difference in stress applied to the end parts of the composite materials between the electrodes.

The inventors find a means capable of reducing the dead space, increasing the capacity density, and reducing the difference in stress applied to the end parts of the composite materials between the electrodes, and thus complete the disclosure.

According to the disclosure, the dead space can be reduced. Accordingly, the capacity density can be increased, and the difference in stress applied to the end parts of the composite materials between the electrodes can be reduced. Accordingly, the cell manufacturing yield as well as the properties and lifetime of the battery can be improved.

In the following, referring to FIGS. 1 to 7, a secondary battery and a comb-type electrode used therein according to an embodiment of the disclosure are described. Here, in this embodiment, the description is made by setting the secondary battery according to the disclosure as a solid state battery.

Figure 1:
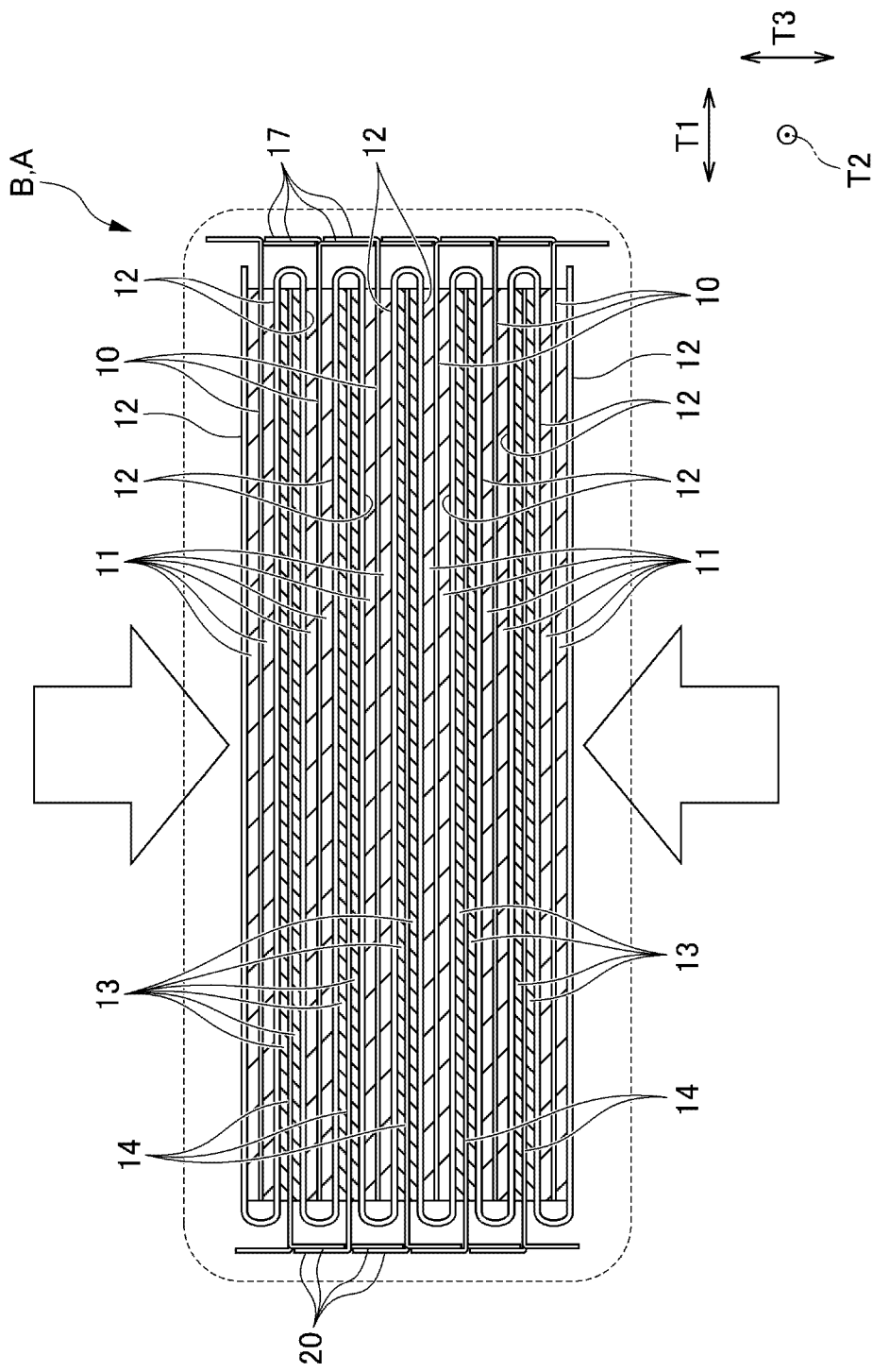
FIG. 1 is a cross-sectional view showing a solid state battery (solid state battery stacked body, a secondary battery) according to an embodiment of the disclosure.

As shown in FIG. 1, a solid state battery (secondary battery) A of the embodiment is configured as including a solid state battery stacked body B formed by integrally stacking a negative electrode current collector layer 10, a negative electrode active material layer (negative electrode composite material layer (mixture layer)) 11, a solid state electrolyte layer 12, a positive electrode active material layer (positive electrode composite material layer (mixture layer)) 13, a positive electrode current collector layer 14, the positive electrode active material layer (positive electrode composite material layer) 13, the solid state electrolyte layer 12, the negative electrode active material layer 11, the negative electrode current collector layer 10, and so on so forth in order.

In addition, the solid state battery A is configured to electrically connect the negative electrode current collector layers 10 while being connected with a negative electrode power collecting tab (not shown), electrically connect the positive electrode current collector layers 14 while being connected with a positive electrode power collecting tab (not shown), and accommodating the solid state battery stacked body B in an exterior body (not shown), such as a laminate film.

By attaching an external terminal to the negative electrode power collecting tab or the positive electrode power collecting tab, and disposing the external terminal on the exterior of the exterior body, the solid state battery A can be electrically connected with an external machine.

[Negative Electrode Current Collector, Negative Electrode Layer Sheet (Electrode Layer Sheet)]

Figure 2:
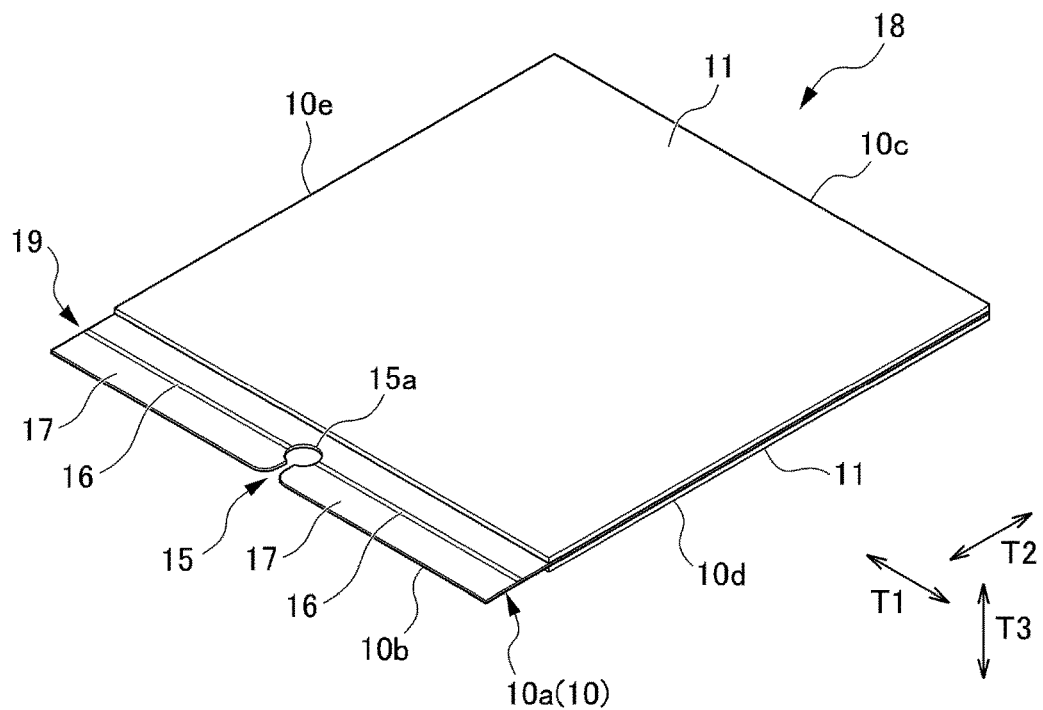
FIG. 2 is a perspective view showing a negative electrode layer sheet (electrode layer sheet, negative electrode current collector) of the solid state battery (solid state battery stacked body, secondary battery) according to an embodiment of the disclosure.

On the other hand, as shown in FIG. 2, a negative electrode current collector (electrode for the negative electrode, electrode sheet for the negative electrode) 10a constituting the negative electrode current collector layer 10 of this embodiment is formed in a substantially rectangular sheet shape having predetermined width and depth dimensions, and is formed to include a notch part 15 that is cut from one end 10b toward the side of another end 10c in a depth direction T2. In addition, in this embodiment, the negative electrode current collector 10a is provided with one notch part 15, but there may also be a plurality of notch parts 15.

In the negative electrode current collector 10a, a grooving part (curved groove part) 16 is disposed to linearly extend along a width direction T1 from the notch part 15 to an side edge 10d in the width direction T1 and from the notch part 15 to another side edge 10e in the width direction T1, respectively.

Figure 3:
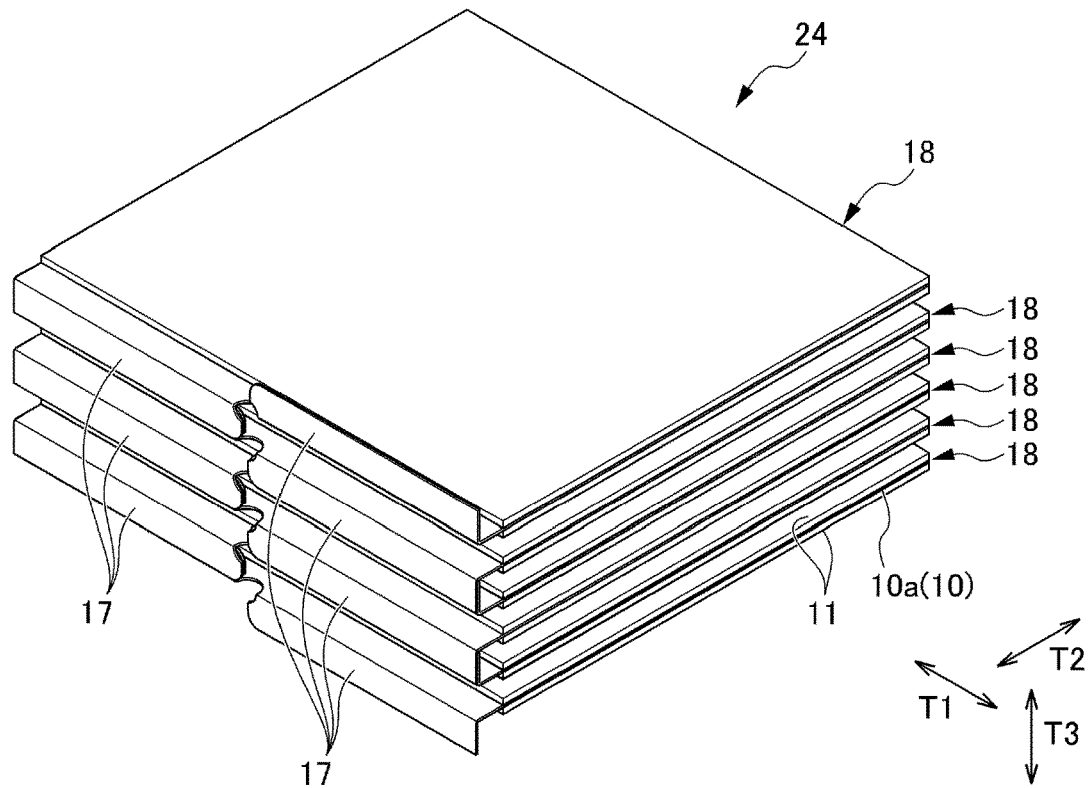
FIG. 3 is a perspective view showing a stacked body (comb-type electrode) of a negative electrode layer sheet of the solid state battery (solid state battery stacked body, secondary battery) according to an embodiment of the disclosure.

Then, as shown in FIG. 3, the negative electrode current collector 10a is disposed by vertically bending the side of the side edge 10d in the width direction T1 at the grooving part 16, with the notch part 15 being sandwiched, to project upward and vertically bending the side of the another side edge 10e in the width direction T1 at the grooving part 16, with the notch part 15 being sandwiched, to project downward. At this time, in this embodiment, by chamfering the corner part of the portion forming the notch part 15, the portion can be prevented from contacting an exterior material, etc., and damaging the exterior material, etc.

In the solid state battery stacked body B, the solid state battery A of this embodiment, as shown in FIGS. 1 and 3, the portions sandwiching the notch part 15 and respectively bent upward and downward form a bent connecting part 17 electrically and mechanically connecting the negative electrode current collectors 10a (negative electrode current collector layers 10) adjacent in a stacking direction T3. The bent connecting part 17 may also serve as a negative electrode power collecting tab.

Figure 4:
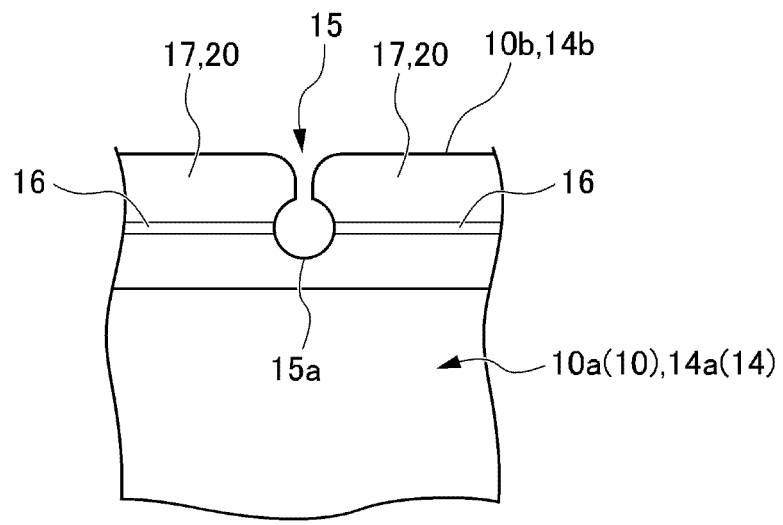
FIG. 4 is a partial plan view of notch parts and bent connecting parts of the negative electrode layer sheet (negative electrode current collector, electrode layer sheet) and a positive electrode layer sheet (positive electrode current collector, electrode layer sheet) of the solid state battery (solid state battery stacked body, secondary battery) according to an embodiment of the disclosure.

In this embodiment, as shown in FIGS. 2 and 4, the notch part 15 is formed by making the side of a base end 15a at the side of the grooving part 16 circular-shaped, etc., to expand the notch width. Accordingly, the bent connecting part 17 can be easily bent, and a plurality of negative electrode current collectors 10a can be connected by using the bent connecting parts 17 to be integrally stacked and disposed suitably. In addition, even in the case where the notch part 15 is disposed, damages such as cracks of the negative electrode current collector 10a can be suppressed.

As shown in FIG. 2, on the negative electrode current collector 10a, the negative electrode active material layer 11 is integrally stacked and formed on a surface and another surface (which may include a side surface (end surface)) of a portion that becomes the negative electrode current collector layer 10. Then, in this embodiment, the negative electrode current collector 10a and the negative electrode active material layers 11 constitute a negative electrode layer sheet 18.

In the negative electrode layer sheet 18, a portion of the side of the end 10b of the negative electrode current collector 10a in the depth direction T2 on which the bent connecting part 17 is present, that is, a portion of the side of the another end 10c in the depth direction T2 from the end 10b of the negative electrode current collector 10a, is configured as a negative electrode active material layer unformed part 19, and the negative electrode active material layer 11 is not stacked and formed on the negative electrode active material layer unformed part 19.

Then, as shown in FIGS. 1 and 3, in the solid state battery stacked body B, the solid state battery A of this embodiment, the negative electrode current collectors 10a (negative electrode layer sheets 18) having the configuration are stacked and disposed at a predetermined gap between the adjacent negative electrode current collectors 10a, the bent connecting part 17 projecting upward of one of the negative electrode current collectors 10a adjacent in the stacking direction T3 is overlapped in the depth direction T2 with the bent connecting part 17 projecting downward of the other of the adjacent negative electrode current collectors 10a, and the overlapped bent connecting parts 17 are welded, etc., to integrally form the negative electrode current collectors 10a, and a comb-type negative electrode (comb-type electrode) 24 of this embodiment is configured.

[Positive Electrode Current Collector, Positive Electrode Layer Sheet (Electrode Layer Sheet)]

Figure 5:
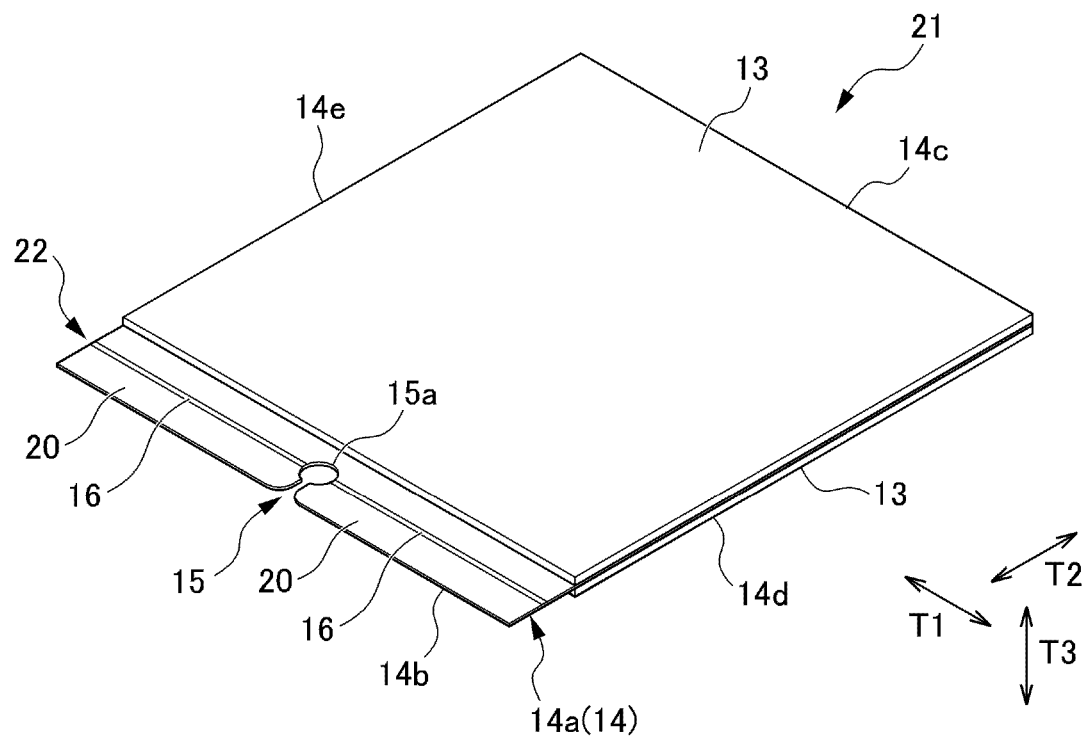
FIG. 5 is a perspective view showing the positive electrode layer sheet (electrode layer sheet, positive electrode current collector) of the solid state battery, the solid state battery stacked body (solid state battery stacked body, secondary battery) according to an embodiment of the disclosure.

Then, as shown in FIG. 5, a positive electrode current collector (electrode for the positive electrode, electrode sheet for the positive electrode) 14a constituting the positive electrode current collector layer 14 of this embodiment is formed in a substantially rectangular sheet shape having predetermined width and depth dimensions, and is formed to include the notch part 15 that is cut from one end 14b toward the side of another end 14c in the depth direction T2. In addition, in this embodiment, the positive electrode current collector 14a is provided with one notch part 15, but there may also be a plurality of notch parts 15.

In the positive electrode current collector 14a, the grooving part (curved groove part) 16 is disposed to linearly extend along the width direction T1 from the notch part 15 to a side edge 14d in the width direction T1 and from the notch part 15 to another side edge 14e in the width direction T1, respectively.

Figure 6:
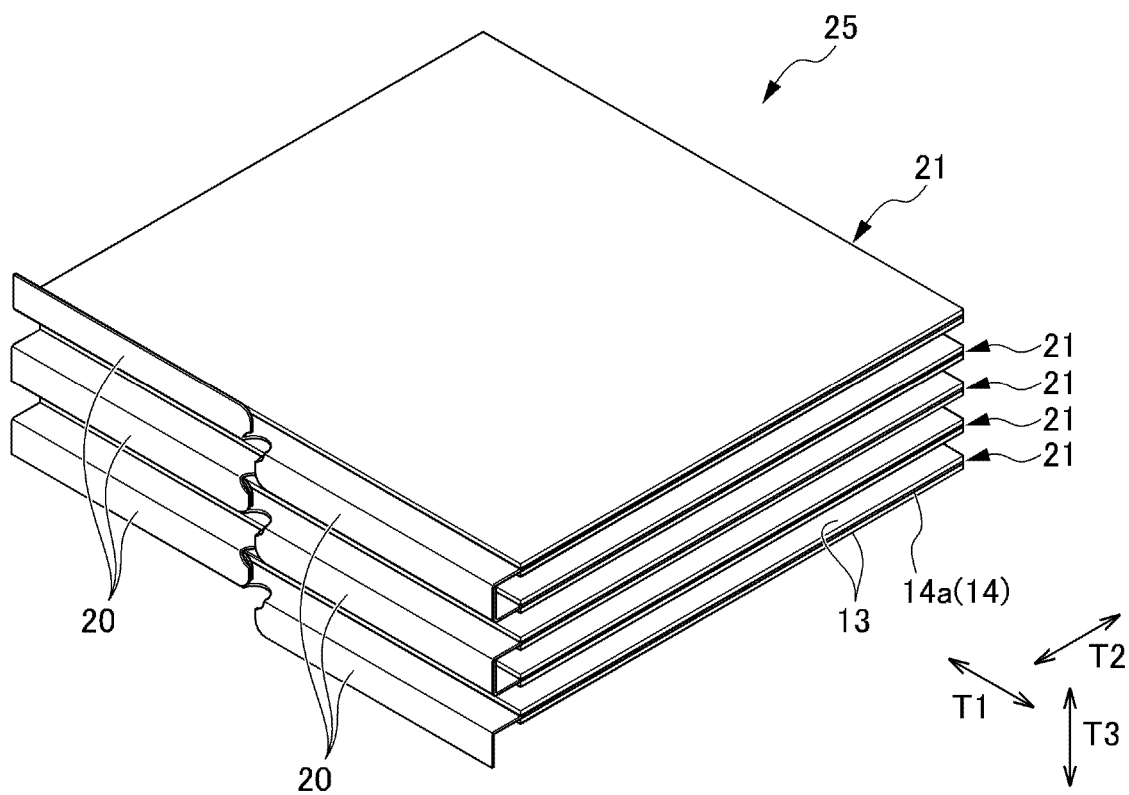
FIG. 6 is a perspective view showing a stacked body (comb-type electrode) of the positive electrode layer sheet of the solid state battery (solid state battery stacked body, secondary battery) according to an embodiment of the disclosure.

Then, as shown in FIG. 6, like the negative electrode current collector 10a, the positive electrode current collector 14a is disposed by vertically bending the side of the side edge 14d in the width direction T1 at the grooving part 16, with the notch part 15 being sandwiched, to project upward and vertically bending the side of the another side edge 14e in the width direction T1 at the grooving part 16, with the notch part 15 being sandwiched, to project downward.

In the solid state battery stacked body B, the solid state battery A of this embodiment, as shown in FIGS. 1 and 6, the portions sandwiching the notch part 15 and respectively bent upward and downward form a bent connecting part 20 electrically and mechanically connecting the negative electrode current collectors 14a adjacent in the stacking direction T3. The bent connecting part 20 may also serve as a positive electrode power collecting tab.

In this embodiment, as shown in FIGS. 4 and 5, the notch part 15 is formed by making the side of the base end 15a at the side of the grooving part 16 circular-shaped, etc., to expand the notch width. Accordingly, the bent connecting part 20 can be easily bent, and a plurality of positive electrode current collectors 14a can be connected by using the bent connecting parts 20 to be integrally stacked and disposed suitably. In addition, even in the case where the notch part 15 is disposed, damages such as cracks of the positive electrode current collector 14a can be suppressed.

As shown in FIG. 5, on the positive electrode current collector 14a, the positive electrode active material layer 13 is integrally stacked and formed on a surface and another surface (which may include a side surface (end surface)) of a portion that becomes the positive electrode current collector layer 14. Then, in this embodiment, the positive electrode current collector 14a and the positive electrode active material layers 13 constitute a positive electrode layer sheet 21.

In the positive electrode layer sheet 21, a portion of the side of the end 14b of the positive electrode current collector 14a in the depth direction T2 on which the bent connecting part 20 is present, that is, a portion of the side of the another end 14c in the depth direction T2 from the end 14b of the positive electrode current collector 14a, is configured as a positive electrode active material layer unformed part 22, and the positive electrode active material layer 13 is not stacked and formed on the positive electrode active material layer unformed part 22.

As shown in FIGS. 1 and 6, in the solid state battery stacked body B, the solid state battery A of this embodiment, the positive electrode current collectors 14a (positive electrode layer sheets 21) having the configuration are stacked and disposed at a predetermined gap between the adjacent positive electrode current collectors 14a, the bent connecting part 20 projecting upward of one of the positive electrode current collectors 14a adjacent in the stacking direction T3 is overlapped in the depth direction T2 with the bent connecting part 20 projecting downward of the other of the adjacent positive electrode current collectors 14a, and the overlapped bent connecting parts 20 are welded, etc., to integrally form the positive electrode current collectors 14a, and a comb-type positive electrode (comb-type electrode) 25 of this embodiment is configured.

As shown in FIG. 1, in the solid state battery stacked body B, the solid state battery A of this embodiment, the negative electrode current collectors 10a (negative electrode layer sheets 18) integrally stacked and formed by welding the bent connecting parts 17, etc., and the positive electrode current collectors 14a (positive electrode layer sheets 21) integrally stacked and formed by welding the bent connecting parts 20, etc., are assembled so that one positive electrode current collector 14a is arranged between the vertically adjacent negative electrode current collectors 10a, and the negative electrode current collectors 10a and the positive electrode current collectors 14a are alternately arranged in the stacking direction T3. In addition, at this time, the negative electrode current collectors 10a and the positive electrode current collectors 14a are assembled so that the bent connecting parts 20 on the positive electrode side are arranged on an end side in the depth direction T2, and the bent connecting parts 17 are arranged on another end side in the depth direction T2.

[Solid State Electrolyte Body (Electrolyte Body)]

Figure 7:
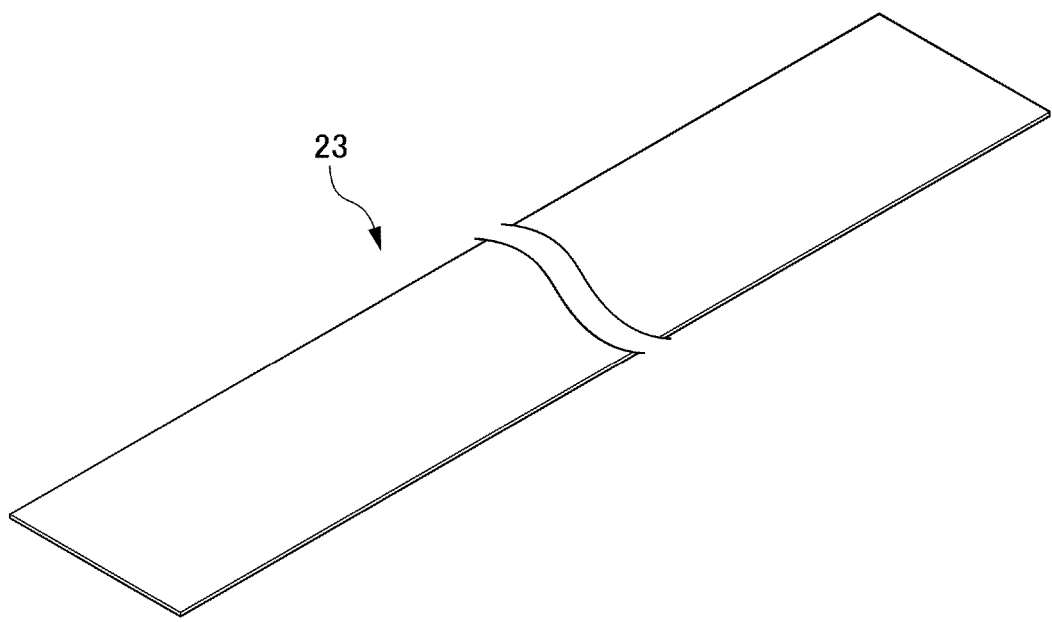
FIG. 7 is a perspective view showing a solid state electrolyte body (electrolyte body) of the solid state battery (solid state battery stacked body, secondary battery) according to an embodiment of the disclosure.
Figure 8:
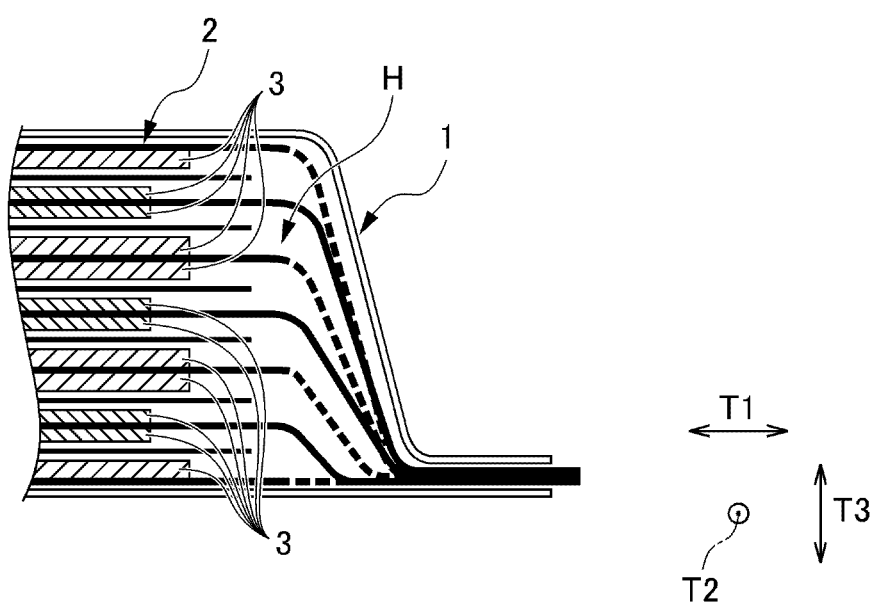
FIG. 8 is a cross-sectional view showing a conventional solid state battery/solid state battery stacked body.

Then, a solid state electrolyte body (solid state electrolyte sheet) 23 forming the solid state electrolyte layer 12 includes electrolyte for ion conduction between the negative electrode active material layer 11 and the positive electrode active material layer 13, and is formed to be belt-like in a substantially rectangular sheet shape having predetermined width and depth dimensions, as shown in FIG. 7.

The solid state electrolyte body 23 is interposed between the negative electrode layer sheet 18 and positive electrode layer sheet 21 (between the negative electrode current collector 10a and the positive electrode current collector 14a) adjacent in the stacking direction T3 in the state in which the negative electrode current collectors 10a and the positive electrode current collectors 14a are assembled. At this time, the belt-like solid state electrolyte body 23 passes through a gap between the negative electrode layer sheets 18 adjacent in the stacking direction T3 and a gap between the positive electrode layer sheets 21 adjacent in the stacking direction T3, is arranged to be substantially zigzag from one side to another side in the stacking direction T3, and is continuously interposed between the adjacent negative electrode layer sheet 18 and positive electrode layer sheet 21.

Here, while the belt-like solid state electrolyte body 23 in the substantially rectangular shape is arranged to be substantially zigzag and continuously interposed between the adjacent negative electrode layer sheet 18 and positive electrode layer sheet 21 in the embodiment, it suffices as long as the solid state electrolyte body 23 is interposed between the adjacent negative electrode layer sheet 18 and positive electrode layer sheet 21. For example, other means, processes, such as disposing a bag-like solid state electrolyte body 23 to enclose the negative electrode layer sheet 18 or the positive electrode layer sheet 21, directly coating the solid state electrolyte 23 (solid state electrolyte layer 12) to the negative electrode layer sheet 18 or the positive electrode layer sheet 21, etc., may also be used.

[Solid State Battery, Solid State Battery Stacked Body]

As described above, in the solid state battery stacked body B, the solid state battery A of this embodiment, the negative electrode current collector layer 10, the negative electrode active material layer 11, the solid state electrolyte layer 12, the positive electrode active material layer 13, the positive electrode current collector layer 14, the positive electrode active material layer 13, the solid state electrolyte layer 12, the negative electrode active material layer 11, the negative electrode current collector layer 10, and so on so forth are sequentially stacked in order.

Moreover, at the stage of sequentially stacking the negative electrode current collector layer 10, the negative electrode active material layer 11, the solid state electrolyte layer 12, the positive electrode active material layer 13, the positive electrode current collector layer 14, the positive electrode active material layer 13, the solid state electrolyte layer 12, the negative electrode active material layer 11, the negative electrode current collector layer 10, and so on so forth, as described above, the solid state battery A of this embodiment is pressed in the stacking direction T3, as shown in FIG. 1, and the negative electrode current collector layer 10, the negative electrode active material layer 11, the solid state electrolyte layer 12, the positive electrode active material layer 13, the positive electrode current collector layer 14, the positive electrode active material layer 13, the solid state electrolyte layer 12, the negative electrode active material layer 11, the negative electrode current collector layer 10, and so on so forth, are tightly adhered and integrated, and the solid state battery stacked body B is formed.

Here, examples of the negative electrode active material included in the negative electrode active material layer 11 include lithium metal, lithium alloy such as Li—Al alloy and Li—In alloy, lithium titanate such as $Li_4Ti_5O_{12}$, silicon oxide or metal silicon, carbon materials such as carbon fiber and graphite, etc. However, the negative electrode active material is not particularly limited. Any known material can be applied as the negative electrode active material of the solid state battery. There is no particular limitation on the composition thereof, and the negative electrode active material may also include solid state electrolyte, a conductive assistant, or a binder, etc.

Examples of the material of the negative electrode current collector 10a include metal, such as SUS, Cu, Ni, Cr, Au, Pt, Al, Fe, Ti, Zn, etc. In addition, examples of the shape of the negative electrode current collector include, for example, a foil shape, a plate shape, a mesh-like shape, an unwoven fabric-like shape, a foam-like shape, etc. Moreover, to facilitate the adhesiveness, carbon, etc., may also be disposed on the surface of the current collector, or the surface of the current collector may be roughened. Furthermore, the negative electrode current collector may also be the negative electrode active material itself. However, the negative electrode current collector 10a is not particularly limited. Any known current collector that can be used in the negative electrode of the solid state battery A can be applied.

Examples of the positive electrode active material included in the positive electrode active material layer 13 include, for example, sulfide such as titanium disulfide, molybdenum disulfide, lithium sulfide or sulfur, transition metal chalcogenide such as niobium selenide, transition metal oxide such as lithium nickelate ($LiNiO_2$), lithium manganate ($LiMnO_2$, $LiMn_2O_4$), lithium cobaltate ($LiCoO_2$), etc.

However, the positive electrode active material is not particularly limited. Any known material can be applied as the positive electrode active material of the solid state battery A. There is no particular limitation on the composition thereof, and the positive electrode active material may also include solid state electrolyte, a conductive assistant, or a binder, etc.

Examples of the material of the positive electrode current collector 14a include metal, etc., such as SUS, Al, Ni, Cr, Au, Pt, Fe, Ti, Zn, or conductive carbon (such as graphite or CNT), etc. In addition, examples of the shape of the positive electrode current collector include, for example, a foil shape, a plate shape, a mesh-like shape, an unwoven fabric-like shape, a foam-like shape, etc. Moreover, to facilitate the adhesiveness, carbon, etc., may also be disposed on the surface of the current collector, or the surface of the current collector may be roughened. However, the positive electrode current collector 14a is not particularly limited. Any known current collector that can be used in the positive electrode of the solid state battery A can be applied.

Examples of the solid state electrolyte of the solid state electrolyte layer 12 (solid state electrolyte sheet 23) include, for example, sulfide-based inorganic solid state electrolyte, NASICON-type oxide-based inorganic solid state electrolyte, perovskite-type oxide inorganic solid state electrolyte, inorganic solid state electrolyte such as lithium-containing salt, or polymer-based solid state electrolyte such as polyethylene oxide, gel-based solid state electrolyte containing lithium-containing salt or lithium ion conductive ionic liquid. However, the solid state electrolyte is not particularly limited. In addition, the solid state electrolyte may include a binder, etc., according to the needs. Regarding the composition ratio of the respective substances included in the solid state electrolyte, there is no particular limitation if the battery can be operated properly. The solid state electrolyte layer 12 (the solid state electrolyte sheet 23) may also be formed by the solid state electrolyte itself, and the solid state electrolyte may also be fixed to a porous substrate including chemically stable materials. The thickness, shape, etc., of the solid state electrolyte layer 12 (the solid state electrolyte sheet 23) are not particularly limited if ion conduction is possible between the positive electrode layer sheet 21 and the negative electrode layer sheet 18. In addition, the manufacturing method is not particularly limited, either.

Therefore, in the solid state battery A (and the negative electrode current collector 10a, the positive electrode current collector 14a of the electrodes used therein) of this embodiment, the notch parts 15 are disposed at the end parts of the negative electrode current collector 10a and the positive electrode current collector 14a, two sides are bent upward and downward (on one side and another side) respectively, with the notch parts 15 being sandwiched, to form the bent connecting parts 17, 20, the negative electrode current collectors 10a (negative electrode layer sheets 18) and the positive electrode current collectors 14a (positive electrode layer sheets 21) are alternately disposed, the solid state electrolyte body 23 is substantially zigzag and interposed continuously between the adjacent negative electrode current collector 10a and positive electrode current collector 14a, the bent connecting parts 17 of the negative electrode current collectors 10a adjacent in the stacking direction T3, the bent connecting parts 20 of the positive electrode current collectors 14a adjacent in the stacking direction T3 are connected, and pressing is applied, thereby forming the solid state battery stacked body B of the solid state battery A. After pressing is applied, the bent connecting parts 17, 20 may also be connected by welding, etc.

Accordingly, the large dead space H generated due to the curvature of the tab welding part 1 as in the conventional art can be eliminated. In addition, the situation where the difference in how tension is applied to the end parts of the composite materials due to the difference in curvature remains as internal stress after the press forming of the solid state battery stacked body (cell) 2 can be reduced (the remaining stress is significantly suppressed).

Moreover, by continuously interposing the sheet-like solid state electrolyte body 23 substantially zigzag from one side to another side in the stacking direction T3 and passing between the negative electrode layer sheet 18 and the positive electrode layer sheet 21 adjacent in the stacking direction T3, the solid state battery stacked body B and thus the solid state battery A can be produced efficiently, and the solid state battery stacked body B, the solid state battery A having a high density and a small dead space can be realized.

Thus, according to the solid state battery A of this embodiment and the negative electrode current collector 10a, the positive electrode current collector 14a of the electrodes used therein, the dead space H can be reduced, so the capacity density can be significantly increased, and the difference between the stresses applied to the end parts of the composite materials between the electrodes can be reduced as much as possible, so the electrode group structure of the solid state battery stacked body B can be suitably maintained. Accordingly, compared to the conventional art, the cell manufacturing yield as well as the properties and lifetime of the battery can be improved significantly, and the solid state battery A with excellent reliability, durability, battery properties can be realized.

In addition, in the solid state battery A of this embodiment and the negative electrode current collector 10a, the positive electrode current collector 14a of the electrodes used therein, by extending the width of the base end side to form the notch parts 15 of the negative electrode current collector 10a and the positive electrode current collector 14a, the chance of having damages such as cracks at the portions where the notch parts 15 are disposed can be reduced.

Moreover, by disposing the grooving parts 16 extending linearly from the notch parts 15 along the width direction T1 in the negative electrode current collector 10a and the positive electrode current collector 14a, respectively, the negative electrode current collector 10a and the positive electrode current collector 14a can be bent easily and accurately to form the bent connecting parts 17 and 20.

Moreover, as shown in FIG. 4, in this embodiment, by chamfering the corner part of the portion forming the notch part 15 to form the notch part 15, the portion can be prevented from contacting the exterior material, etc., and damaging the exterior material.

While an embodiment of the secondary battery of the disclosure and the comb-type electrode used therein is described above, the disclosure is not limited to the above embodiment, and can be modified as appropriate without departing from the spirit of the disclosure.

For example, even though in this embodiment, the secondary battery according to the disclosure is described as a solid state battery, the secondary battery according to the disclosure needs not be limited to a solid state battery. It may also be configured that liquid electrolyte (electrolyte body) is interposed between the adjacent negative electrode layer sheet 18 and positive electrode layer sheet 21.

In the case of interposing the liquid electrolyte (electrolyte body), in the state where the negative electrode current collectors 10a and the positive electrode current collectors 14a are assembled, a separator may be interposed between the negative electrode layer sheet 18 and the positive electrode layer sheet 21 (between negative electrode current collector 10a and positive electrode current collector 14a) adjacent in the stacking direction T3.

The liquid electrolyte (electrolyte body) is not particularly limited, and any known electrolytic solution used in a lithium ion battery can be applied.

The material of the electrolytic solution is not particularly limited, either. Examples of the solvent constituting the electrolytic solution include ethylene carbonate, dimethyl carbonate, ethyl methyl carbonate, propylene carbonate, etc. These solvents may also be mixed and used. In addition, examples of the electrolyte constituting the electrolytic solution include lithium-containing salt such as $LiPF_6$, $LiBF_4$, $LiClO_4$, or lithium-containing ionic liquid such as LiTFSi. These electrolytes may also be mixed and used. In addition, the electrolytic solution may include an additive, etc., according to the needs.

Furthermore, in this embodiment, the description is made by setting the solid state electrolyte body according to the disclosure as the solid state electrolyte sheet 23. With respect to this, it may also be configured that the negative electrode active material layer 11 is stacked and formed on the negative electrode current collector 10a and the solid state electrolyte layer 12 is stacked and formed on the negative electrode active material layer 11, or the positive electrode active material layer 13 is stacked and formed on the positive electrode current collector 14a and the solid state electrolyte layer 12 is stacked and formed on the positive electrode active material layer 13, so as to include the solid state electrolyte body.

In this case, it may be configured that an insulating layer formed by integrally stacking insulating materials and/or a solid state electrolyte layer formed by integrally stacking solid state electrolyte (a negative electrode current collector covering layer including an insulating layer and/or a solid state electrolyte layer) is disposed on the negative electrode active material layer unformed part 19 of the negative electrode current collector 10a and the end surface of the negative electrode current collector 10a of the portion forming the negative electrode active material layer unformed part 19.

In addition, it may be configured that an insulating layer formed by integrally stacking insulating materials and/or a solid state electrolyte layer formed by integrally stacking solid state electrolyte (a positive electrode current collector covering layer including an insulating layer and/or a solid state electrolyte layer) is disposed on the positive electrode active material layer unformed part 22 of the positive electrode current collector 14a and the end surface of the positive power electrode current collector 14a of the portion forming the positive electrode active material layer unformed part 22.

Furthermore, the negative electrode current collector covering layer may be formed in a thickness equal to that of the negative electrode active material layer 11 (or a combined layer of the negative electrode active material layer 11 and the solid state electrolyte layer 12 stacked on the negative electrode active material layer 11). In addition, the positive electrode current collector covering layer may be formed in a thickness equal to that of the positive electrode active material layer 13 (or a combined layer of the positive electrode active material layer 13 and the solid state electrolyte layer 12 stacked on the positive electrode active material layer 13).

Accordingly, in the manufacturing process of the solid state battery, when the solid state battery stacked body B is pressed in the stacking direction T3, a gap is not left at a portion of the negative electrode active material unformed part 19 of the negative electrode current collector 10a or a portion of the positive electrode active material unformed part 22 of the positive electrode current collector 14a to make the negative electrode active material unformed part 19 or the positive electrode active material layer unformed part 22 a region that induces cracks to occur. In addition, the flatness tolerance and the parallelism tolerance of the negative electrode stacked body (negative electrode for the solid state battery) and the positive electrode stacked body (positive electrode for the solid state battery) can be minimized. As a result, the volume can be reduced when multiple layers are formed, and contributions for obtaining higher energy can be made.

Here, examples of the insulating material constituting the insulating layer include examples of resin having an insulating property, such as thermoplastic insulating resin like polyethylene, polypropylene, polystyrene, ABS resin, etc., thermosetting insulation resin like phenol resin, epoxy resin, polyurethane, alkyd resin, etc. However, the insulating material is not particularly limited.

Examples of the solid state electrolyte of the solid state electrolyte layer that forms the negative electrode current collector covering layer or the positive electrode current collector covering layer include, for example, sulfide-based inorganic solid state electrolyte, NASICON-type oxide-based inorganic solid state electrolyte, perovskite-type oxide inorganic solid state electrolyte, inorganic solid state electrolyte such as lithium-containing salt, or polymer-based solid state electrolyte such as polyethylene oxide, gel-based solid state electrolyte containing lithium-containing salt and lithium ion conductive ionic liquid. The material of the solid state electrolyte of the solid state electrolyte layer that becomes the negative electrode current collector covering layer or the positive electrode current collector covering layer may be the same as the solid state electrolyte used in the solid state electrolyte layer 12 when constituting the solid state battery A. Particularly, sulfide-based inorganic solid electrolyte may be adopted. However, it does not require any particular limitation on the solid state electrolyte.

What is claimed is:

1. A secondary battery comprising:
    a negative electrode layer sheet formed by integrally stacking a negative electrode active material layer on a surface of a negative electrode current collector and another surface of the negative electrode current collector, wherein the negative electrode current collector is a sheet-like electrode;
    a positive electrode layer sheet formed by integrally stacking a positive electrode active material layer on a surface of a positive electrode current collector and another surface of the positive electrode current collector, wherein the positive electrode current collector is a sheet-like electrode, wherein a plurality of the negative electrode layer sheet and a plurality of the positive electrode layer sheet are alternately stacked and disposed;
    an electrolyte body interposed between the negative electrode layer sheet and the positive electrode layer sheet adjacent to each other in a stacking direction,
    notch parts cut out at end parts of the negative electrode current collector and the positive electrode current collector, each of the negative electrode current collector and the positive electrode current collector comprises a bent connecting part including a first bent connecting part and a second bent connecting part sandwiching the notch part that is cut out, the first bent connecting part and the second bent connecting part sandwiching the notch part are bent in directions opposite to each other, and the bent connecting parts of the plurality of the negative electrode current collectors adjacent in the stacking direction are connected, and the bent connecting parts of the plurality of the positive electrode current collectors adjacent in the stacking direction are connected.

2. The secondary battery as claimed in claim 1, wherein a sheet-like solid state electrolyte body is continuously interposed by passing between the negative electrode layer sheet and the positive electrode layer sheet adjacent in the stacking direction and being substantially zigzag from a side to another side in the stacking direction.

3. The secondary battery as claimed in claim 2, wherein the notch part is formed by expanding a width of a base end side.

4. The secondary battery as claimed in claim 2, wherein a grooving part linearly extending along a width direction from the notch part is disposed on each of the negative electrode current collector and the positive electrode current collector.

5. The secondary battery as claimed in claim 1, wherein the notch part is formed by expanding a width of a base end side.

6. The secondary battery as claimed in claim 5, wherein a grooving part linearly extending along a width direction from the notch part is disposed on each of the negative electrode current collector and the positive electrode current collector.

7. The secondary battery as claimed in claim 1, wherein a grooving part linearly extending along a width direction from the notch part is disposed on each of the negative electrode current collector and the positive electrode current collector.

8. A comb-type electrode, comprising:
a plurality of electrode layer sheets, wherein each electrode layer sheet includes a bent connecting part having a first bent connecting part and a second bent connecting part which sandwiches a notch part cut out at an end part of each electrode layer sheet,
wherein the first bent connecting part and the second bent connecting part sandwiching the notch part are bent in directions opposite to each other, the plurality of electrode layer sheets are stacked and disposed at a predetermined interval, and the comb-type electrode is formed by connecting bent connecting parts of electrode layer sheets that are adjacent to each other in a stacking direction.

9. The comb-type electrode as claimed in claim 8, wherein the notch part of the electrode layer sheet is formed by expanding a width of a base end side.

10. The comb-type electrode as claimed in claim 9, wherein a grooving part which linearly extends along a width direction from the notch part and serves for bending the bent connecting part is disposed on the electrode layer sheet.

11. The comb-type electrode as claimed in claim 8, wherein a grooving part which linearly extends along a width direction from the notch part and serves for bending the bent connecting part is disposed on the electrode layer sheet.

* * * * *